(12) United States Patent
Huang et al.

(10) Patent No.: US 11,137,573 B2
(45) Date of Patent: Oct. 5, 2021

(54) PROJECTION LENS ASSEMBLY

(71) Applicant: ZHEJIANG SUNNY OPTICAL CO., LTD., Ningbo (CN)

(72) Inventors: Lin Huang, Ningbo (CN); Xinquan Wang, Ningbo (CN)

(73) Assignee: ZHEJIANG SUNNY OPTICAL CO., LTD.

( * ) Notice: Subject to any disclaimer, the term of this patent is extended or adjusted under 35 U.S.C. 154(b) by 179 days.

(21) Appl. No.: 16/226,945

(22) Filed: Dec. 20, 2018

(65) Prior Publication Data

US 2019/0179116 A1    Jun. 13, 2019

Related U.S. Application Data

(63) Continuation of application No. PCT/CN2018/087036, filed on May 16, 2018.

(30) Foreign Application Priority Data

Dec. 13, 2017  (CN) .......................... 201711326578.6
Dec. 13, 2017  (CN) .......................... 201721731020.1

(51) Int. Cl.
*G02B 13/00* (2006.01)
*G02B 9/12* (2006.01)
*G02B 9/16* (2006.01)

(52) U.S. Cl.
CPC ........... *G02B 13/0035* (2013.01); *G02B 9/12* (2013.01); *G02B 9/16* (2013.01)

(58) Field of Classification Search
CPC .. G02B 13/0035; G02B 13/004; G02B 13/16; G02B 9/12; G02B 9/14; G02B 9/16;
(Continued)

(56) References Cited

U.S. PATENT DOCUMENTS

| 4,690,515 A | 9/1987 | Nakajima et al. |
| 5,596,455 A | 1/1997 | Eckhardt |

(Continued)

FOREIGN PATENT DOCUMENTS

| CN | 85109241 A | 7/1986 |
| CN | 1189222 A | 7/1998 |

(Continued)

OTHER PUBLICATIONS

PCT International Search Report and Written Opinion completed by the ISA/CN dated Sep. 4, 2018 and issued in connection with PCT/CN2018/087036.

*Primary Examiner* — Marin Pichler
(74) *Attorney, Agent, or Firm* — Barnes & Thornburg LLP

(57) ABSTRACT

The present disclosure discloses a projection lens assembly. The projection lens assembly includes, sequentially along an optical axis from an image-source side to an image side, a first lens having a positive refractive power or a negative refractive power; a second lens having a positive refractive power or a negative refractive power; and a third lens having a positive refractive power, wherein an image-side surface of the first lens is a convex surface. A distance TTL on the optical axis from an image-source plane of the projection lens assembly to the image-side surface of the third lens and a total effective focal length f of the projection lens assembly satisfy: TTL/f<1.4. An effective focal length f3 of the third lens and the total effective focal length f of the projection lens assembly satisfy: 0<f3/f<18.0.

15 Claims, 8 Drawing Sheets

(58) Field of Classification Search
CPC ... G02B 9/18; G02B 9/20; G02B 9/22; G02B 9/24; G02B 9/28; G02B 9/30; G02B 9/32; G02B 9/34; G02B 27/0043; G02B 27/18
USPC .................................. 359/784, 785–792, 649
See application file for complete search history.

(56) References Cited

U.S. PATENT DOCUMENTS

| | | |
|---|---|---|
| 8,810,930 B2 | 8/2014 | Ishikawa |
| 2012/0275029 A1 | 11/2012 | Ishikawa |
| 2017/0017063 A1 | 1/2017 | Song et al. |
| 2019/0137733 A1* | 5/2019 | Gong .................... G01B 11/25 |
| 2019/0137734 A1* | 5/2019 | Gong ................ G02B 13/0035 |
| 2019/0179111 A1* | 6/2019 | Chen .................... G02B 13/004 |
| 2020/0124825 A1* | 4/2020 | Liu ........................ G02B 13/18 |

FOREIGN PATENT DOCUMENTS

| | | |
|---|---|---|
| CN | 101963694 A | 2/2011 |
| CN | 102707412 A | 10/2012 |
| CN | 103777315 A | 5/2014 |
| CN | 205333955 U | 6/2016 |
| CN | 205880337 U | 1/2017 |
| CN | 106681093 A | 5/2017 |
| CN | 107505689 A | 12/2017 |
| CN | 107861316 A | 3/2018 |
| CN | 207516710 | 6/2018 |
| JP | H05145873 A | 6/1993 |
| JP | 2014109741 A | 6/2014 |
| WO | 9852076 A1 | 11/1998 |

* cited by examiner

PROJECTION LENS ASSEMBLY

CROSS-REFERENCE TO RELATED APPLICATIONS

This application is a continuation of International Application No. PCT/CN2018/087036, filed on May 16, 2018, which claims the priorities and rights to Chinese Patent Application No. 201711326578.6 and Chinese Patent Application No. 201721731020.1 filed with the China National Intellectual Property Administration (CNIPA) on Dec. 13, 2017, All of the aforementioned applications are hereby incorporated by reference in their entireties.

TECHNICAL FIELD

The present disclosure relates to a projection lens assembly, and more specifically to a projection lens assembly including three lenses.

BACKGROUND

In recent years, with the continuous improvement of the science and technology and the stepwise rise of interactive devices, the application range of projection lens assembly has become more and more wide. Nowadays, due to the quick development of chip technology and smart algorithm, a three-dimensional image having position depth information may be calculated by using an optical projection lens assembly to project an image to a space object and receive the image signal. The three-dimensional image having the depth information may be further used in the development of various depth applications such as the biometric identification.

In general, in the conventional projection lens assembly for imaging, various aberrations are eliminated and resolution is enhanced by increasing the number of lenses. However, the increase of the number of the lenses will cause an increase of the total track length of the projection lens assembly, which is not conductive to achieving the miniaturization of the lens assembly. In addition, the general projection lens assembly having a large field-of-view also has many problems such as large distortion and poor imaging quality.

SUMMARY

The present disclosure provides a projection lens assembly which may be applicable to portable electronic products and may at least or partially solve at least one of the above disadvantages in the existing technology.

According to an aspect, the present disclosure provides a projection lens assembly. The projection lens assembly includes, sequentially along an optical axis from an image-source side to an image side, a first lens having a positive refractive power or a negative refractive power; a second lens having a positive refractive power or a negative refractive power; and a third lens having a positive refractive power, wherein an image-side surface of the third lens may be a convex surface. A distance TTL on the optical axis from an image-source plane of the projection lens assembly to the image-side surface of the third lens and a total effective focal length f of the projection lens assembly may satisfy: $TTL/f<1.4$. An effective focal length $f3$ of the third lens and the total effective focal length f of the projection lens assembly may satisfy: $0<f3/f<18.0$.

In an implementation, a center thickness CT1 of the first lens on the optical axis and a center thickness CT2 of the second lens on the optical axis may satisfy: $1.3<CT1/CT2<1.8$.

In an implementation, a radius of curvature R6 of the image-side surface of the third lens and the total effective focal length f of the projection lens assembly may satisfy: $-0.5<R6/f<0$.

In an implementation, a spacing distance T12 on the optical axis between the first lens and the second lens and a center thickness CT3 of the third lens on the optical axis may satisfy: $0.1<T12/CT3<0.8$.

In an implementation, an effective semi-diameter DT22 of an image-side surface of the second lens and an effective semi-diameter DT21 of an image-source-side surface of the second lens may satisfy: $1.0<DT22/DT21<1.5$.

In an implementation, an effective semi-diameter DT32 of the image-side surface of the third lens and an effective semi-diameter DT31 of an image-source-side surface of the third lens may satisfy: $1.0<DT32/DT31<1.3$.

In an implementation, half of a maximal field-of-view HFOV of the prejection lens assembly may satisfy: $HFOV<10°$.

In an implementation, a light transmittance of the projection lens assembly may be greater than 85% within a light wavelength range from 800 nm to 1000 nm.

In an implementation, a distance BF on the optical axis from the image-source plane of the projection lens assembly to an image-source-side surface of the first lens and the distance TTL on the optical axis from the image-source plane of the projection lens assembly to the image-side surface of the third lens may satisfy: $0<BF/TTL<0.5$.

According to another aspect, the present disclosure provides a projection lens assembly. The projection lens assembly includes, sequentially along an optical axis from an image-source side to an image side, a first lens having a positive refractive power or a negative refractive power; a second lens having a positive refractive power or a negative refractive power; and a third lens having a positive refractive power, wherein an image-side surface of the third lens may be a convex surface. A distance TTL on the optical axis from an image-source plane of the projection lens assembly to the image-side surface of the third lens and a total effective focal length f of the projection lens assembly may satisfy: $TTL/f<1.4$. An effective focal length $f3$ of the third lens and an effective focal length $f1$ of the first lens may satisfy: $-1.0<f3/f1<30.0$.

In an implementation, the effective focal length $f3$ of the third lens and the total effective focal length f of the projection lens assembly may satisfy: $0.5<f3/f<1.6$.

According to another aspect, the present disclosure provides a projection lens assembly. The projection lens assembly includes, sequentially along an optical axis from an image-source side to an image side, a first lens having a positive refractive power or a negative refractive power; a second lens having a positive refractive power or a negative refractive power; and a third lens having a positive refractive power, wherein an image-side surface of the third lens may be a convex surface. A center thickness CT1 of the first lens on the optical axis and a center thickness CT2 of the second lens on the optical axis may satisfy: $1.3<CT1/CT2<1.8$.

According to another aspect, the present disclosure provides a projection lens assembly. The projection lens assembly includes, sequentially along an optical axis from an image-source side to an image side, a first lens having a positive refractive power or a negative refractive power; a second lens having a positive refractive power or a negative refractive power; and a third lens having a positive refractive power, wherein an image-side surface of the third lens may be a convex surface. A radius of curvature R6 of the image-side surface of the third lens and a total effective focal length f of the projection lens assembly may satisfy: $-0.5<R6/f<0$.

According to another aspect, the present disclosure provides a projection lens assembly. The projection lens assembly includes, sequentially along an optical axis from an image-source side to an image side, a first lens having a positive refractive power or a negative refractive power; a second lens having a positive refractive power or a negative refractive power; and a third lens having a positive refractive power, wherein an image-side surface of the third lens may be a convex surface. An effective semi-diameter DT22 of an image-side surface of the second lens and an effective semi-diameter DT21 of an image-source-side surface of the second lens may satisfy: $1.0<DT22/DT21<1.5$.

According to another aspect, the present disclosure provides a projection lens assembly. The projection lens assembly includes, sequentially along an optical axis from an image-source side to an image side, a first lens having a positive refractive power or a negative refractive power; a second lens having a positive refractive power or a negative refractive power; and a third lens having a positive refractive power, wherein an image-side surface of the third lens may be a convex surface. An effective semi-diameter DT32 of the image-side surface of the third lens and an effective semi-diameter DT31 of an image-source-side surface of the third lens may satisfy: $1.0<DT32/DT31<1.3$.

The present disclosure adopts a plurality of lenses (e.g., three lenses). By reasonably distributing the refractive powers and the surface types of the lenses, the center thicknesses of the lenses, the spacing distances on the optical axis between the lenses, etc., the projection lens assembly has at least one of the beneficial effects such as large aperture, miniaturization, and high imaging quality.

BRIEF DESCRIPTION OF THE DRAWINGS

By describing non-limiting implementations below in detail and in combination with the accompanying drawings, other features, objectives and advantages of the present disclosure will be more apparent. In the accompanying drawings.

DETAILED DESCRIPTION

Figure 1:
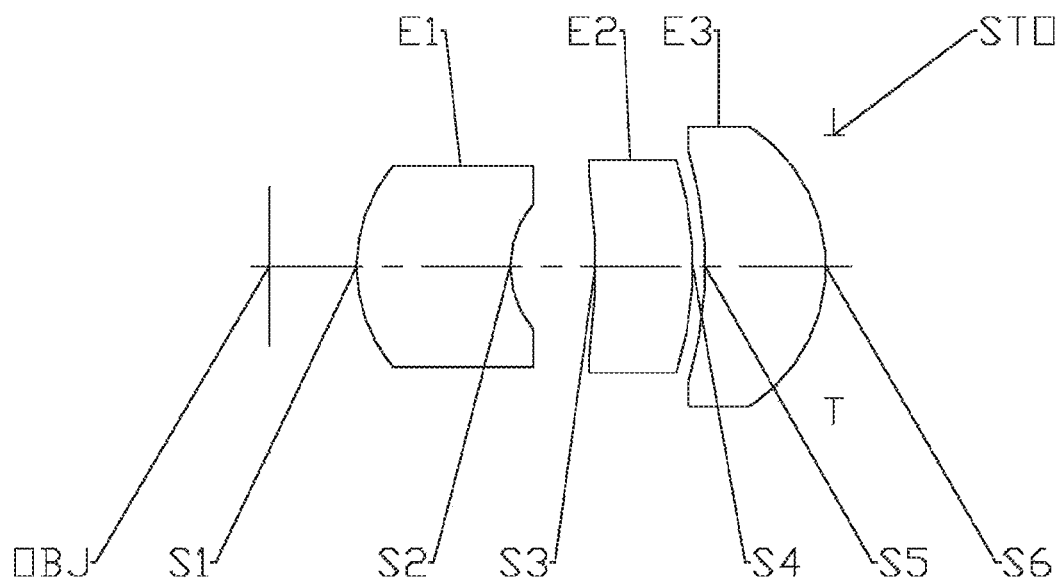
FIG. 1 is a schematic structural diagram illustrating a projection lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions such as "first" and "second" are only used to distinguish one feature from another, rather than represent any limitations to the features. Thus, without departing from the teachings of the present disclosure, the first lens discussed below may also be referred to as the second lens, and the second lens may also be referred to as the first lens.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area; and if a surface of a lens is a concave surface and a position of the concave surface is not defined, it indicates that the surface of the lens is a concave surface at least in the paraxial area. The surface closest to the image-source side in each lens is referred to as the image-source-side surface, and the surface closest to the image side in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

The projection lens assembly according to exemplary implementations of the present disclosure may include, for example, three lenses (i.e., a first lens, a second lens, and a third lens) having refractive powers. The three lenses are arranged in sequence along an optical axis from an image-source side to an image side.

In the exemplary implementations, the first lens has a positive refractive power or a negative refractive power. The second lens has a positive refractive power or a negative refractive power. The third lens may have a positive refractive power.

In the exemplary implementations, at least one of the image-source-side surface of the first lens or the image-side surface of the first lens may be a convex surface. In some implementations, the first lens may be a biconvex lens having an image-source-side surface and an image-side surface that are convex surfaces.

In the exemplary implementations, at least one of the image-source-side surface of the third lens or the image-side surface of the third lens may be a convex surface. Alternatively, the image-side surface of the third lens is a convex surface.

In the exemplary implementations, the projection lens assembly of the present disclosure may satisfy the conditional expression HFOV<10°. Here, HFOV is the half of the maximum field-of-view of the projection lens assembly. More specifically, HFOV may further satisfy: HFOV<9°, for example, 7.9°≤HFOV≤8.4°. Satisfying the conditional expression HFOV<10° is conductive to controlling the image in the off-axis field, to reduce the aberration in the off-axis field, thereby improving the projection quality. At the same time, it is also conductive to improving the uniformity of the projection depth and imaging quality of the on-axis field and the off-axis field.

In the exemplary implementations, the projection lens assembly of the present disclosure may satisfy the conditional expression 0<f3/f<18.0. Here, f3 is the effective focal length of the third lens, and f is the total effective focal length of the projection lens assembly. More specifically, f3 and f may further satisfy: 0.50<f3/f<1.60, for example, 0.56≤f3/f≤1.58. Th reasonable distribution of the refractive power is conductive to achieving the miniaturization and the high projection quality of the projection lens assembly.

In the exemplary implementations, the projection lens assembly of the present disclosure may satisfy the conditional expression −1.0<f3/f1<30.0. Here, f3 is the effective focal length of the third lens, and f1 is the effective focal length of the first lens. More specifically, f3 and f1 may further satisfy: −0.50<f3/f1<1.50, for example, −0.41≤f3/f1≤1.44. The reasonable distribution of the refractive power is conductive to achieving the miniaturization and the high projection quality of the projection lens assembly.

In the exemplary implementations, the projection lens assembly of the present disclosure has a light transmittance greater than 85% within a light wavelength range from about 800 nm to about 1000 nm. Such a setting is conductive to improving the transmittance of the near-infrared light transmitting through the projection lens assembly, so as to obtain a higher-brightness near-infrared projected image.

In the exemplary implementations, the projection lens assembly of the present disclosure may satisfy the conditional expression −0.5<R6/f<0. Here, R6 is the radius of curvature of the image-side surface of the third lens, and f is the total effective focal length of the projection lens assembly. More specifically, R6 and f may further satisfy: −0.45<R6/f<−0.20, for example, −0.39≤R6/f≤−0.28. Reasonably arranging the bending direction and the curvature of the image-side surface of the third lens is conductive to achieving the miniaturization and the high projection quality of the projection lens assembly.

In the exemplary implementations, the projection lens assembly of the present disclosure may satisfy the conditional expression 1.3<CT1/CT2<1.8. Here, CT1 is the center thickness of the first lens on the optical axis, and CT2 is the center thickness of the second lens on the optical axis. More specifically, CT1 and CT2 may further satisfy: 1.39≤CT1/CT2≤1.78. The reasonable distribution of the size is conductive to achieving the miniaturization of the projection lens assembly and the telecentricity of light at the image-source side, to improve the projection efficiency.

In the exemplary implementations, the projection lens assembly of the present disclosure may satisfy the conditional expression 0.1<T12/CT3<0.8. Here, T12 is the spacing distance on the optical axis between the first lens and the second lens, and CT3 is the center thickness of the third lens on the optical axis. More specifically, T12 and CT3 may further satisfy: 0.15≤T12/CT3≤0.78. The reasonable distribution of the size is conductive to achieving the miniaturization of the projection lens assembly and the telecentricity of light at the image-source side, to improve the projection efficiency.

In the exemplary implementations, the projection lens assembly of the present disclosure may satisfy the conditional expression 1.0<DT22/DT21<1.5. Here, DT22 is the effective semi-diameter of the image-side surface of the second lens, and DT21 is the effective semi-diameter of the image-source-side surface of the second lens. More specifically, DT22 and DT21 may further satisfy: 1.01≤DT22/DT21≤1.49. Satisfying the conditional expression 1.0<DT22/DT21<1.5 is conductive to achieving the miniaturization of the projection lens assembly.

In the exemplary implementations, the projection lens assembly of the present disclosure may satisfy the conditional expression 1.0<DT32/DT31<1.3. Here, DT32 is the effective semi-diameter of the image-side surface of the third lens, and DT31 is the effective semi-diameter of the image-source-side surface of the third lens. More specifically, DT32 and DT31 may further satisfy: 1.07≤DT32/DT31≤1.22. Satisfying the conditional expression 1.0<DT32/DT31<1.3 is conductive to achieving the miniaturization of the projection lens assembly.

In the exemplary implementations, the projection lens assembly of the present disclosure may satisfy the conditional expression TTL/f<1.4. Here, TTL is the distance on the axis from the image-source plane of the projection lens assembly to the image-side surface of the third lens, and f is the total effective focal length of the projection lens assembly. More specifically, TTL and f may further satisfy: 0.90<TTL/f<1.10, for example, 0.95≤TTL/f≤1.04. For the projection lens assembly, reasonably controlling the ratio of TTL to f is conductive to maintaining the miniaturization characteristic of the projection lens assembly.

In the exemplary implementations, the projection lens assembly of the present disclosure may satisfy the conditional expression 0<BF/TTL<0.5. Here, BF is the distance on the axis from the image-source plane of the projection lens assembly to the image-source-side surface of the first lens, and TTL is the distance on the axis from the image-source plane of the projection lens assembly to the image-side surface of the third lens. More specifically, BF and TTL may further satisfy: 0.10<BF/TTL<0.20, for example, 0.16≤BF/TTL≤0.17. The reasonable distribution of the size may effectively shorten the total length of the projection lens assembly, to achieve the miniaturization.

In the exemplary implementations, the above projection lens assembly may further include at least one diaphragm, to improve the imaging quality of the lens assembly. The diaphragm may be disposed at any position as needed. For example, the diaphragm may be disposed between the third lens and the image side.

Alternatively, the above projection lens assembly may further include other well-known optical projection elements such as prisms and field lenses. Alternatively, the above projection lens assembly can be used in conjunction with a diffractive element.

The main difference between the common lens assembly and the projection lens assembly lies in that, the light of the common camera lens assembly forms one image plane from an object side to an image side, and the light of the common projection lens assembly, from an image-source side to an image side, enlarges an image plane and projects the image plane up to the projection plane. The amount of light entering the common projection lens assembly is controlled by an object-side numerical aperture and the diaphragm of the lens assembly.

The projection lens assembly according to the above implementations of the present disclosure may use, for example, three lenses. By reasonably distributing the refractive powers and the surface types of the lenses, the center thicknesses of the lenses, the spacing distances on the axis between the lenses, etc., the projection lens assembly has beneficial effects such as large aperture, miniaturization, and high imaging quality.

In the implementations of the present disclosure, at least one of the surfaces of the lenses is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the projection lens assembly without departing from the technical solution claimed by the present disclosure. For example, although the projection lens assembly having three lenses is described as an example in the implementations, the projection lens assembly is not limited to include three lenses. If desired, the projection lens assembly may also include other numbers of lenses.

Specific embodiments of the projection lens assembly that may be applied to the above implementations are further described below with reference to the accompanying drawings.

Embodiment 1

A projection lens assembly according to Embodiment 1 of the present disclosure is described below with reference to FIGS. 1-2. FIG. 1 is a schematic structural diagram illustrating the projection lens assembly according to Embodiment 1 of the present disclosure.

As shown in FIG. 1, the projection lens assembly according to the exemplary implementations of the present disclosure includes, sequentially along an optical axis from an image-source side to an image side, a first lens E1, a second lens E2, a third lens E3, and a diaphragm STO.

The first lens E1 has a positive refractive power, an image-source-side surface S1 of the first lens E1 is a convex surface, and an image-side surface S2 of the first lens E1 is a concave surface. The second lens E2 has a positive refractive power, an image-source-side surface S3 of the second lens E2 is a concave surface, and an image-side surface S4 of the second lens E2 is a convex surface. The third lens E3 has a positive refractive power, an image-source-side surface S5 of the third lens E3 is a concave surface, and an image-side surface S6 of the third lens E3 is a convex surface. A light transmittance of the projection lens assembly is greater than 85% within a light wavelength range from about 800 nm to about 1000 nm. Light from an image source sequentially passes through the surfaces S1-S6 and finally forms an image on, for example, the projection plane of a projection screen (not shown).

Table 1 shows the surface type, the radius of curvature, the thickness, the material and the conic coefficient of each lens of the projection lens assembly in Embodiment 1. The units of the radius of curvature and the thickness are both millimeters (mm).

TABLE 1

| surface number | surface type | radius of curvature | thickness | material refractive index | abbe number | conic co-efficient |
|---|---|---|---|---|---|---|
| OBJ | spherical | infinite | 0.5500 | | | |
| S1 | aspheric | 1.0619 | 0.9658 | 1.79 | 24.1 | −0.5285 |
| S2 | aspheric | 0.8063 | 0.5334 | | | 1.6762 |
| S3 | aspheric | −1.4219 | 0.6143 | 1.53 | 55.9 | 3.4122 |
| S4 | aspheric | −0.9146 | 0.0779 | | | 0.3234 |
| S5 | aspheric | −1.11873 | 0.7586 | 1.53 | 55.9 | 1.3166 |
| S6 | aspheric | −1.0189 | 0.0500 | | | −2.1044 |
| STO | spherical | infinite | 500.0000 | | | |
| IMA | spherical | infinite | | | | |

As may be obtained from Table 1, the image-source-side surface and the image-side surface of any lens in the first to third lenses E1-E3 are both aspheric surfaces. In this embodiment, the surface type x of each of the aspheric surfaces may be defined using, but not limited to, the following formula:

$$x = \frac{ch^2}{1+\sqrt{1-(k+1)c^2h^2}} + \Sigma Aih^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1); and Ai is the correction coefficient of the $i^{th}$ order of the aspheric surface. Table 2 below shows the high-order coefficients $A_4$, $A_6$, $A_8$, $A_{10}$, $A_{12}$, $A_{14}$, and $A_{16}$ applicable to the aspheric surfaces S1-S6 in Embodiment 1.

TABLE 2

| surface number | A4 | A6 | A8 | A10 | A12 | A14 | A16 |
|---|---|---|---|---|---|---|---|
| S1 | 1.7403E−01 | 8.5470E−02 | −3.7411E−01 | 1.2943E+00 | −2.0040E+00 | 1.2411E+00 | −2.5877E−01 |
| S2 | 5.1397E−01 | 2.0099E+00 | −1.3364E+01 | 3.7230E+02 | −3.8130E+03 | 2.1958E+04 | −5.2625E+04 |
| S3 | 3.0780E−01 | 1.3245E+00 | 4.4444E+00 | −7.0268E+00 | 4.5587E+01 | −2.1399E+02 | 2.7958E+02 |
| S4 | 6.4853E−01 | 7.0267E−02 | 3.3372E+00 | −1.1370E+01 | 4.6156E+01 | −1.0047E+02 | 8.6258E+01 |
| S5 | 5.8080E−01 | −2.7377E−01 | 2.5580E+00 | −8.4375E+00 | 2.6202E+01 | −4.8557E+01 | 3.8617E+01 |
| S6 | −2.2184E−01 | 1.0860E−02 | 5.2973E−02 | −4.0158E−01 | 8.0170E−01 | −8.3079E−01 | 2.6656E−01 |

Table 3 shows the total effective focal length f of the projection lens assembly in Embodiment 1, the effective focal lengths f1-f3 of the lenses, and the half of the maximal field-of-view HFOV of the prejection lens assembly.

TABLE 3

| | parameter | | | |
|---|---|---|---|---|
| f (mm) | f1 (mm) | f2 (mm) | f3 (mm) | HFOV (°) |
| numerical value 3.38 | 6.32 | 3.44 | 5.35 | 8.4 |

The projection lens assembly in Embodiment 1 satisfies:

f3/f=1.58, wherein f3 is the effective focal length of the third lens E3, and f is the total effective focal length of the projection lens assembly;

f3/f1=0.85, wherein f3 is the effective focal length of the third lens E3, and f1 is the effective focal length of the first lens E1;

R6/f=−0.30, wherein R6 is the radius of curvature of the image-side surface S6 of the third lens E3,and f is the total effective focal length of the projection lens assembly;

CT1/CT2=1.57, wherein CT1 is the center thickness of the first lens E1 on the optical axis, and CT2 is the center thickness of the second lens E2 on the optical axis;

T12/CT3=0.70, wherein T12 is the spacing distance on the optical axis between the first lens E1 and the second lens E2, and CT3 is the center thickness of the third lens E3 on the optical axis;

DT22/DT21=1.16, wherein DT22 is the effective semi-diameter of the image-side surface S4 of the second lens E2, and DT21 is the effective semi-diameter of the image-source-side surface S3 of the second lens E2;

DT32/DT31=1.21, wherein DT32 is the effective semi-diameter of the image-side surface S6 of the third lens E3, and DT31 is the effective semi-diameter of the image-source-side surface S5 of the third lens E3;

TTL/f=1.04, wherein TTL is the distance on the axis from the image-source plane OBJ to the image-side surface S6 of the third lens E3, and f is the total effective focal length of the projection lens assembly; and BF/TTL=0.16, wherein BF is the distance on the axis from the image-source plane OBJ to the image-source-side surface S1 of the first lens E1, and TTL is the distance on the axis from the image-source plane OBJ to the image-side surface S6 of the third lens E3.

Figure 2:
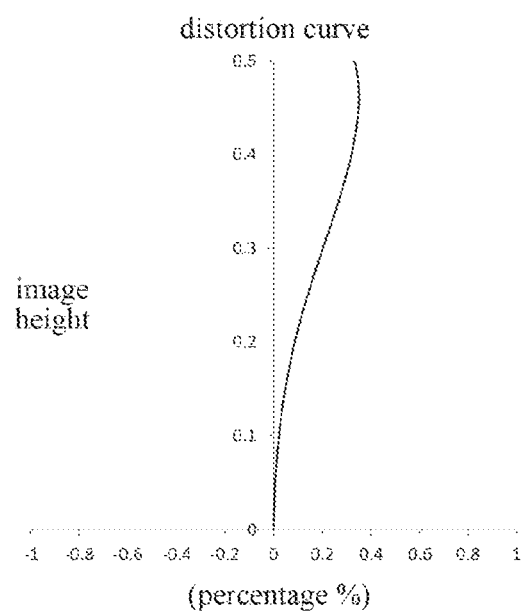
FIG. 2 illustrates a distortion curve of the projection lens assembly according to Embodiment 1.

FIG. 2 illustrates the distortion curve of the projection lens assembly according to Embodiment 1, representing amounts of distortion at different viewing angles. It can be seen from FIG. 2 that the projection lens assembly according to Embodiment 1 can achieve a good imaging quality.

Embodiment 2

Figure 3:
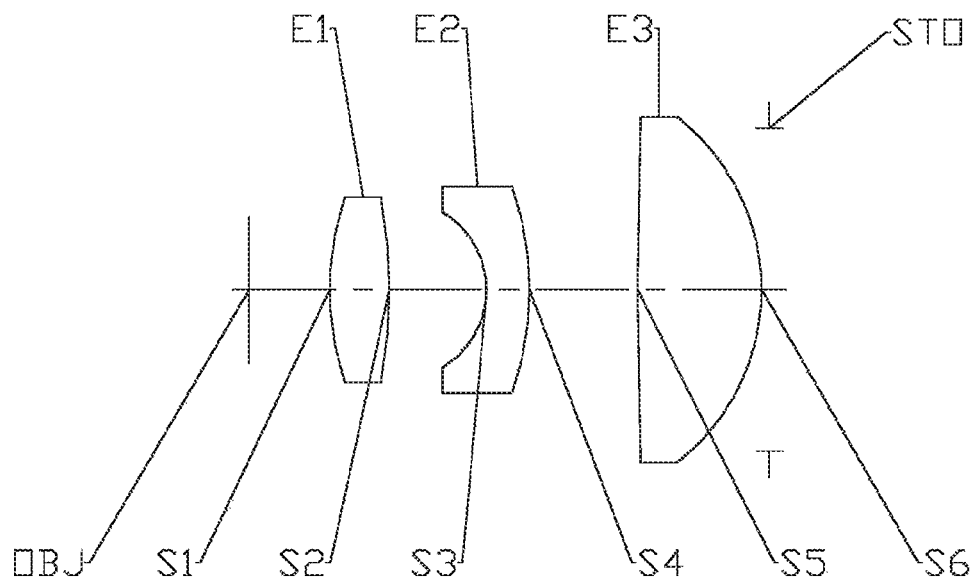
FIG. 3 is a schematic structural diagram illustrating a projection lens assembly according to Embodiment 2 of the present disclosure.

A projection lens assembly according to Embodiment 2 of the present disclosure is described below with reference to FIGS. 3-4. In this embodiment and the following embodiments, for the purpose of brevity, the description of parts similar to those in Embodiment 1 will be omitted. FIG. 3 is a schematic structural diagram illustrating the projection lens assembly according to Embodiment 2 of the present disclosure.

As shown in FIG. 3, the projection lens assembly according to the exemplary implementations of the present disclosure includes, sequentially along an optical axis from an image-source side to an image side, a first lens E1, a second lens E2, a third lens E3, and a diaphragm STO.

The first lens E1 has a positive refractive power, an image-source-side surface S1 of the first lens E1 is a concave surface, and an image-side surface S2 of the first lens E1 is a convex surface. The second lens E2 has a negative refractive power, an image-source-side surface S3 of the second lens E2 is a concave surface, and an image-side surface S4 of the second lens E2 is a convex surface. The third lens E3 has a positive refractive power, an image-source-side surface S5 of the third lens E3 is a convex surface, and an image-side surface S6 of the third lens E3 is a convex surface. A light transmittance of the projection lens assembly is greater than 85% within a light wavelength range from about 800 nm to about 1000 nm. Light from an image source sequentially passes through the surfaces S1-S6 and finally forms an image on, for example, the projection plane of a projection screen (not shown).

Table 4 shows the surface type, the radius of curvature, the thickness, the material and the conic coefficient of each lens of the projection lens assembly in Embodiment 2. The radius of curvature and the thickness are both shown in millimeters (mm).

TABLE 4

| surface number | surface type | radius of curvature | thickness | material refractive index | abbe number | conic coefficient |
|---|---|---|---|---|---|---|
| OBJ | spherical | infinite | 0.5500 | | | |
| S1 | aspheric | −8.0467 | 0.4065 | 1.49 | 81.6 | −34.3570 |
| S2 | aspheric | −1.5944 | 0.6656 | | | −5.1083 |
| S3 | aspheric | −0.5372 | 0.2925 | 1.53 | 55.9 | −1.3695 |
| S4 | aspheric | −1.5431 | 0.7374 | | | −5.6461 |
| S5 | aspheric | 8.8505 | 0.8480 | 1.53 | 55.9 | 26.0634 |
| S6 | aspheric | −1.4220 | 0.0500 | | | −2.1499 |
| STO | spherical | infinite | 500.0000 | | | |
| IMA | spherical | infinite | | | | |

As may be obtained from Table 4, in Embodiment 2, the image-source-side surface and the image-side surface of any lens in the first to third lenses E1-E3 are both aspheric surfaces. Table 5 shows the high-order coefficients applicable to each aspheric surface in Embodiment 2. The surface type of each aspheric surface may be defined by the formula (1) given in Embodiment 1.

TABLE 5

| surface number | A4 | A6 | A8 | A10 | A12 |
|---|---|---|---|---|---|
| S1 | 6.8351E−01 | 5.2701E−01 | −1.0157E+00 | 3.6591E−01 | 1.4452E+00 |
| S2 | 2.9371E−01 | 2.5816E−01 | −5.7110E−02 | −1.5555E+00 | 3.4950E+00 |
| S3 | −5.1990E−02 | −2.1888E+00 | 8.0976E−01 | −5.2364E+00 | −2.2880E−02 |
| S4 | 2.2615E−01 | −7.2416E−01 | 7.8852E−01 | −1.3640E−02 | 1.4131E−02 |
| S5 | −3.4340E−02 | −5.0100E−03 | −3.8100E−03 | 4.7710E−03 | −1.0300E−03 |
| S6 | −7.8150E−02 | 8.9240E−03 | −9.2700E−03 | 1.4960E−03 | −6.8000E−04 |

Table 6 shows the total effective focal length f of the projection lens assembly in Embodiment 2, the effective focal lengths f1-f3 of the lenses, and the half of the maximal field-of-view HFOV of the prejection lens assembly.

TABLE 6

| | parameter | | | | |
|---|---|---|---|---|---|
| | f (mm) | f1 (mm) | f2 (mm) | f3 (mm) | HFOV (°) |
| numerical value | 3.60 | 3.97 | −1.74 | 2.40 | 8.0 |

Figure 4:
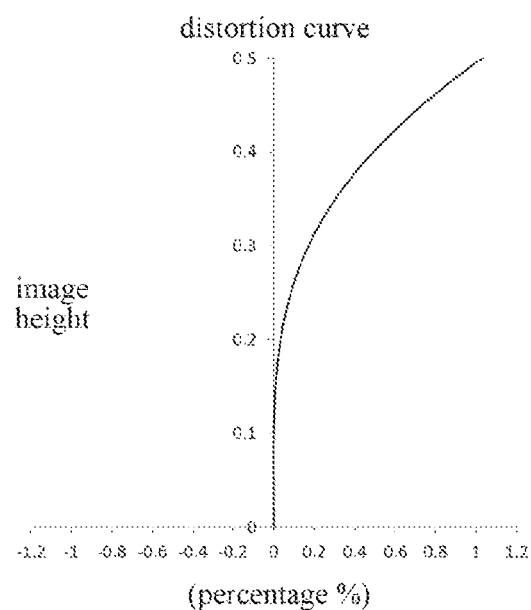
FIG. 4 illustrates a distortion curve of the projection lens assembly according to Embodiment 2.

FIG. 4 illustrates the distortion curve of the projection lens assembly according to Embodiment 2, representing amounts of distortion at different viewing angles. It can be seen from FIG. 4 that the projection lens assembly according to Embodiment 2 can achieve a good imaging quality.

Embodiment 3

Figure 5:
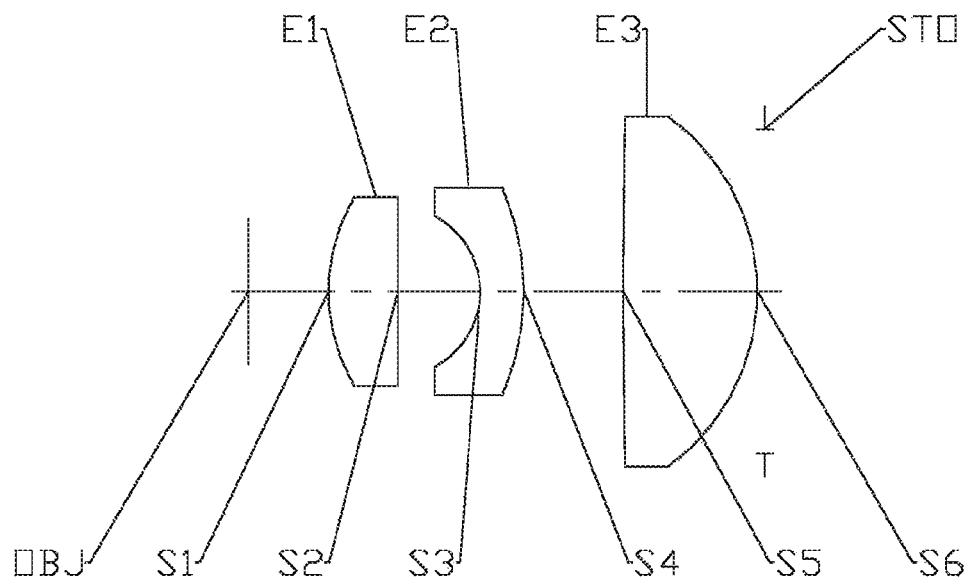
FIG. 5 is a schematic structural diagram illustrating a projection lens assembly according to Embodiment 3 of the present disclosure.

A projection lens assembly according to Embodiment 3 of the present disclosure is described below with reference to FIGS. 5-6. FIG. 5 is a schematic structural diagram illustrating the projection lens assembly according to Embodiment 3 of the present disclosure.

As shown in FIG. 5, the projection lens assembly according to the exemplary implementations of the present disclosure includes, sequentially along an optical axis from an image-source side to an image side, a first lens E1, a second lens E2, a third lens E3, and a diaphragm STO.

The first lens E1 has a positive refractive power, an image-source-side surface S1 of the first lens E1 is a convex surface, and an image-side surface S2 of the first lens E1 is a convex surface. The second lens E2 has a negative refractive power, an image-source-side surface S3 of the second lens E2 is a concave surface, and an image-side surface S4 of the second lens E2 is a convex surface. The third lens E3 has a positive refractive power, an image-source-side surface S5 of the third lens E3 is a convex surface, and an image-side surface S6 of the third lens E3 is a convex surface. A light transmittance of the projection lens assembly is greater than 85% within a light wavelength range from about 800 nm to about 1000 nm. Light from an image source sequentially passes through the surfaces S1-S6 and finally forms an image on, for example, the projection plane of a projection screen (not shown).

Table 7 shows the surface type, the radius of curvature, the thickness, the material and the conic coefficient of each lens of the projection lens assembly in Embodiment 3. The radius of curvature and the thickness are both shown in millimeters (mm).

TABLE 7

| surface number | surface type | radius of curvature | thickness | material refractive index | abbe number | conic coefficient |
|---|---|---|---|---|---|---|
| OBJ | spherical | infinite | 0.5500 | | | |
| S1 | aspheric | 8.7964 | 0.4769 | 1.49 | 81.6 | 49.6518 |
| S2 | aspheric | −2.6464 | 0.5683 | | | −17.3605 |
| S3 | aspheric | −0.5054 | 0.3000 | 1.53 | 55.9 | −1.3480 |
| S4 | aspheric | −1.2815 | 0.6815 | | | −5.0963 |
| S5 | aspheric | 11.8828 | 0.9234 | 1.53 | 55.9 | 48.9010 |
| S6 | aspheric | −1.3944 | 0.0500 | | | −2.1235 |
| STO | spherical | infinite | 500.0000 | | | |
| IMA | spherical | infinite | | | | |

As may be obtained from Table 7, in Embodiment 3, the image-source-side surface and the image-side surface of any lens in the first to third lenses E1-E3 are both aspheric surfaces. Table 8 shows the high-order coefficients applicable to each aspheric surface in Embodiment 3. The surface type of each aspheric surface may be defined by the formula (1) given in Embodiment 1.

TABLE 8

| surface number | A4 | A6 | A8 | A10 | A12 | A14 | A16 |
|---|---|---|---|---|---|---|---|
| S1 | 8.1772E−01 | 1.9586E−01 | −1.2690E+00 | 4.4820E+00 | −8.6822E+00 | 1.2180E+01 | −7.6760E+00 |
| S2 | 4.8126E−01 | 1.8981E−01 | −1.3418E+00 | 8.9492E+00 | −4.2799E+01 | 1.1981E+02 | −1.5560E+02 |
| S3 | 8.0382E−02 | −3.3871E+00 | 2.0978E+00 | 1.9198E+02 | −9.5609E+01 | 3.4126E+02 | −7.0140E+02 |
| S4 | 2.5353E−01 | −9.7331E−01 | 1.0812E+00 | 1.7342E+00 | −8.0399E+00 | 1.2775E+01 | −7.2752E+00 |
| S5 | −1.5080E−02 | −5.4730E−02 | 9.7142E−02 | −1.1644E−01 | 8.8297E−02 | −3.6150E−02 | 6.0590E−03 |
| S6 | −7.9820E−02 | 6.1200E−03 | −5.8700E−03 | 3.2270E−03 | −4.8200E−03 | 2.8270E−03 | −6.0000E−04 |

Table 9 shows the total effective focal length f of the projection lens assembly in Embodiment 3, the effective focal lengths f1-f3 of the lenses, and the half of the maximal field-of-view HFOV of the projection lens assembly.

TABLE 9

| | parameter | | | |
|---|---|---|---|---|
| | f (mm) | f1 (mm) | f2 (mm) | f3 (mm) | HFOV (°) |
| numerical value | 3.56 | 4.20 | −1.83 | 2.43 | 8.1 |

Figure 6:
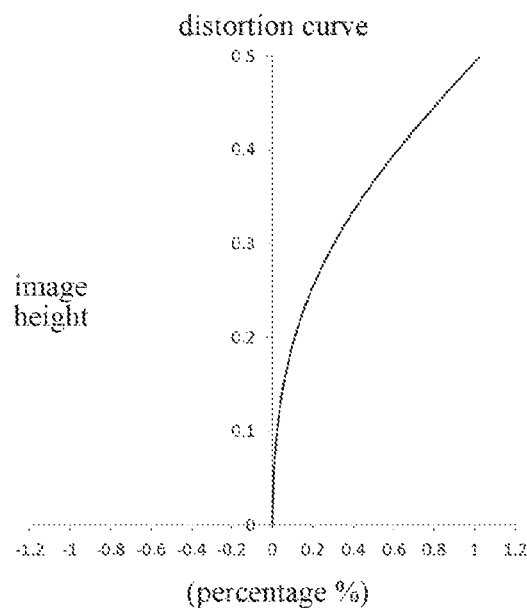
FIG. 6 illustrates a distortion curve of the projection lens assembly according to Embodiment 3.

FIG. 6 illustrates the distortion curve of the projection lens assembly according to Embodiment 3, representing amounts of distortion at different viewing angles. It can be seen from FIG. 6 that the projection lens assembly according to Embodiment 3 can achieve a good imaging quality.

Embodiment 4

Figure 7:
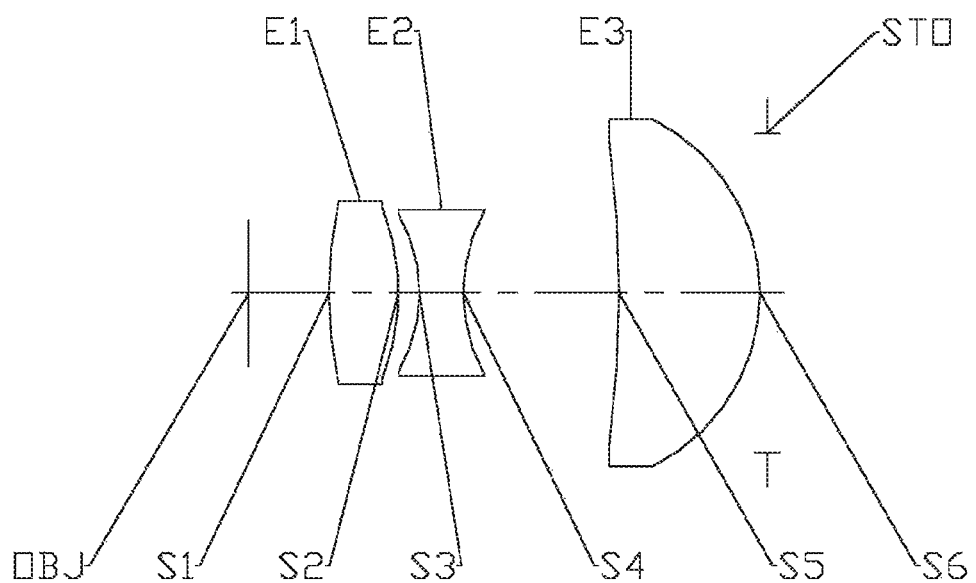
FIG. 7 is a schematic structural diagram illustrating a projection lens assembly according to Embodiment 4 of the present disclosure.

A projection lens assembly according to Embodiment 4 of the present disclosure is described below with reference to FIGS. 7-8. FIG. 7 is a schematic structural diagram illustrating the projection lens assembly according to Embodiment 4 of the present disclosure.

As shown in FIG. 7, the projection lens assembly according to the exemplary implementations of the present disclosure includes, sequentially along an optical axis from an image-source side to an image side, a first lens E1, a second lens E2, a third lens E3, and a diaphragm STO.

The first lens E1 has a positive refractive power, an image-source-side surface S1 of the first lens E1 is a concave surface, and an image-side surface S2 of the first lens E1 is a convex surface. The second lens E2 has a negative refractive power, an image-source-side surface S3 of the second lens E2 is a concave surface, and an image-side surface S4 of the second lens E2 is a concave surface. The third lens E3 has a positive refractive power, an image-source-side surface S5 of the third lens E3 is a concave surface, and an image-side surface S6 of the third lens E3 is a convex surface. A light transmittance of the projection lens assembly is greater than 85% within a light wavelength range from about 800 nm to about 1000 nm. Light from an image source sequentially passes through the surfaces S1-S6 and finally forms an image on, for example, the projection plane of a projection screen (not shown).

Table 10 shows the surface type, the radius of curvature, the thickness, the material and the conic coefficient of each lens of the projection lens assembly in Embodiment 4. The radius of curvature and the thickness are both shown in millimeters (mm).

TABLE 10

| surface number | surface type | radius of curvature | thickness | material refractive index | material abbe number | conic coefficient |
|---|---|---|---|---|---|---|
| OBJ | spherical | infinite | 0.5500 | | | |
| S1 | aspheric | −12.4476 | 0.4746 | 1.74 | 51.2 | −96.9561 |
| S2 | aspheric | −1.2122 | 0.1445 | | | −2.0033 |
| S3 | aspheric | −1.7540 | 0.3000 | 1.53 | 55.9 | 4.2615 |
| S4 | aspheric | 0.9689 | 1.0660 | | | −0.2657 |
| S5 | aspheric | −16.2639 | 0.9649 | 1.53 | 55.9 | 50.0000 |
| S6 | aspheric | −1.2465 | 0.0500 | | | −0.2314 |
| STO | spherical | infinite | infinite | | | |
| IMA | spherical | infinite | | | | |

As may be obtained from Table 10, in Embodiment 4, the image-source-side surface and the image-side surface of any lens in the first to third lenses E1-E3 are both aspheric surfaces. Table 11 shows the high-order coefficients applicable to each aspheric surface in Embodiment 4. The surface type of each aspheric surface may be defined by the formula (1) given in Embodiment 1.

TABLE 11

| surface number | A4 | A6 | A8 | A10 | A12 | A14 | A16 |
|---|---|---|---|---|---|---|---|
| S1 | 5.4916E−01 | −8.7336E−01 | 2.8610E+00 | −2.8827E+00 | −1.6627E+00 | 1.5437E+01 | −1.5632E+01 |
| S2 | 6.7383E−01 | −4.4333E+00 | 1.7415E+01 | −4.5964E+01 | 9.0242E+01 | −1.1229E+02 | 8.6482E+01 |
| S3 | 1.4161E−01 | −9.0635E+00 | 4.8773E+01 | −1.4907E+02 | 2.5989E+02 | −1.2798E+02 | −1.8523E+02 |
| S4 | −5.8094E−01 | −1.2946E+00 | 2.1553E+01 | −9.6196E+01 | 2.4807E+02 | −3.4695E+02 | 1.9469E+02 |
| S5 | −2.5880E−02 | −2.5850E−02 | 5.8756E−02 | −8.2370E−02 | 8.0436E−02 | −4.1940E−02 | 8.6780E−03 |
| S6 | 1.3940E−03 | −4.3600E−03 | 3.0950E−03 | −2.9800E−03 | 7.2800E−04 | 1.7500E−04 | −5.2000E−05 |

Table 12 shows the total effective focal length f of the projection lens assembly in Embodiment 4, the effective focal lengths f1-f3 of the lenses, and the half of the maximal field-of-view HFOV of the prejection lens assembly.

TABLE 12

| | parameter | | | |
|---|---|---|---|---|
| | f (mm) | f1 (mm) | f2 (mm) | f3 (mm) | HFOV (°) |
| numerical value | 3.45 | 1.78 | −1.14 | 2.51 | 8.3 |

Figure 8:
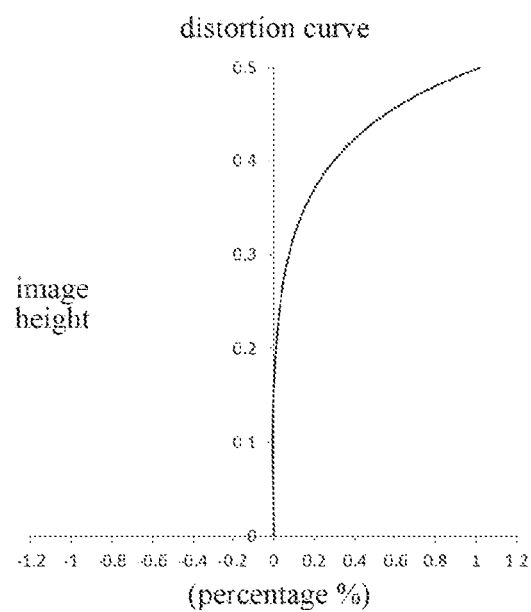
FIG. 8 illustrates a distortion curve of the projection lens assembly according to Embodiment 4.

FIG. 8 illustrates the distortion curve of the projection lens assembly according to Embodiment 4, representing amounts of distortion at different viewing angles. It can be seen from FIG. 8 that the projection lens assembly according to Embodiment 4 can achieve a good imaging quality.

Embodiment 5

Figure 9:
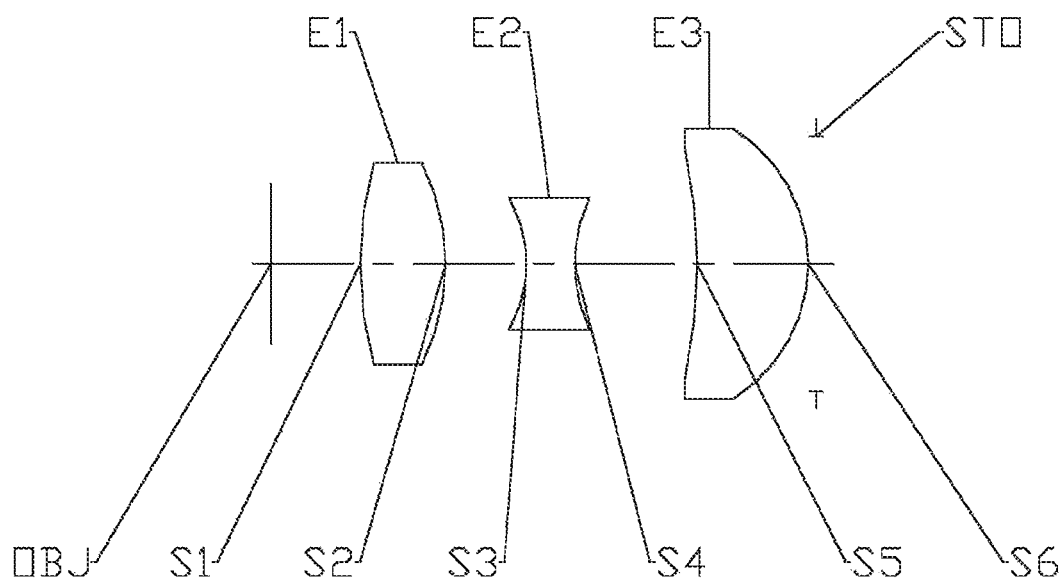
FIG. 9 is a schematic structural diagram illustrating a projection lens assembly according to Embodiment 5 of the present disclosure.

A projection lens assembly according to Embodiment 5 of the present disclosure is described below with reference to FIGS. 9-10. FIG. 9 is a schematic structural diagram illustrating the projection lens assembly according to Embodiment 5 of the present disclosure.

As shown in FIG. 9, the projection lens assembly according to the exemplary implementations of the present disclosure includes, sequentially along an optical axis from an image-source side to an image side, a first lens E1, a second lens E2, a third lens E3, and a diaphragm STO.

The first lens E1 has a positive refractive power, an image-source-side surface S1 of the first lens E1 is a convex surface, and an image-side surface S2 of the first lens E1 is a convex surface. The second lens E2 has a negative refractive power, an image-source-side surface S3 of the second lens E2 is a concave surface, and an image-side surface S4 of the second lens E2 is a concave surface. The third lens E3 has a positive refractive power, an image-source-side surface S5 of the third lens E3 is a concave surface, and an image-side surface S6 of the third lens E3 is a convex surface. A light transmittance of the projection lens assembly is greater than 85% within a light wavelength range from about 800 nm to about 1000 nm. Light from an image source sequentially passes through the surfaces S1-S6 and finally forms an image on, for example, the projection plane of a projection screen (not shown).

Table 13 shows the surface type, the radius of curvature, the thickness, the material and the conic coefficient of each lens of the projection lens assembly in Embodiment 5. The curvature and the thickness are both shown in millimeters (mm).

TABLE 13

| | | | | material | | |
|---|---|---|---|---|---|---|
| surface number | surface type | radius of curvature | thickness | refractive index | abbe number | conic coefficient |
| OBJ | spherical | infinite | 0.5564 | | | |
| S1 | aspheric | 2.1973 | 0.5327 | 1.68 | 55.5 | −14.0655 |
| S2 | aspheric | −1.5553 | 0.5059 | | | 0.6552 |
| S3 | aspheric | −0.7541 | 0.3000 | 1.55 | 71.7 | −0.3305 |
| S4 | aspheric | 1.3646 | 0.7639 | | | 1.7314 |
| S5 | aspheric | −4.5098 | 0.6936 | 1.57 | 59.5 | 10.4945 |
| S6 | aspheric | −0.9765 | 0.0500 | | | −0.0747 |
| STO | spherical | infinite | 1000.0000 | | | |
| IMA | spherical | infinite | | | | |

As may be obtained from Table 13, in Embodiment 5, the image-source-side surface and the image-side surface of any lens in the first to third lenses E1-E3 are both aspheric surfaces. Table 14 shows the high-order coefficients applicable to each aspheric surface in Embodiment 5. The surface type of each aspheric surface ma be defined by the formula (1) given in Embodiment 1.

TABLE 14

| surface number | A4 | A6 | A8 | A10 | A12 |
|---|---|---|---|---|---|
| S1 | 4.0492E−02 | −6.2450E−02 | 3.8444E−01 | −2.4728E−01 | 2.3434E−01 |
| S2 | −1.8559E−01 | 3.1456E−01 | −1.0484E−01 | −5.2760E−02 | 4.3063E−01 |
| S3 | 1.4242E−01 | 1.9738E+00 | −7.7372E+00 | 1.4805E+01 | −1.6900E+01 |
| S4 | 7.1021E−01 | 1.3595E+00 | −4.3531E+00 | 1.3515E+01 | −1.9659E+01 |
| S5 | −5.3760E−02 | 5.6370E−03 | −8.5300E−03 | −1.8520E−02 | 3.2693E−02 |
| S6 | 1.9140E−03 | 8.1600E−04 | −9.0000E−04 | 9.1800E−04 | −3.1200E−03 |

Table 15 shows the total effective focal length f of the projection lens assembly in Embodiment 5, the effective focal lengths f1-f3 of the lenses, and the half of the maximal field-of-view HFOV of the prejection lens assembly.

TABLE 15

| | parameter | | | |
|---|---|---|---|---|
| | f (mm) | f1 (mm) | f2 (mm) | f3 (mm) | HFOV (°) |
| numerical value | 3.54 | 1.41 | −0.85 | 2.03 | 8.1 |

Figure 10:
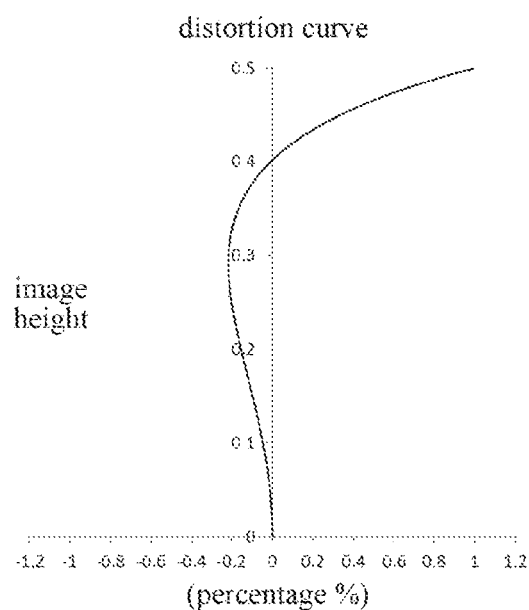
FIG. 10 illustrates a distortion curve of the projection lens assembly according to Embodiment 5.

FIG. 10 illustrates the distortion curve of the projection lens assembly according to Embodiment 5, representing amounts of distortion at different viewing angles. It can be seen from FIG. 10 that the projection lens assembly according to Embodiment 5 can achieve a good imaging quality.

Embodiment 6

Figure 11:
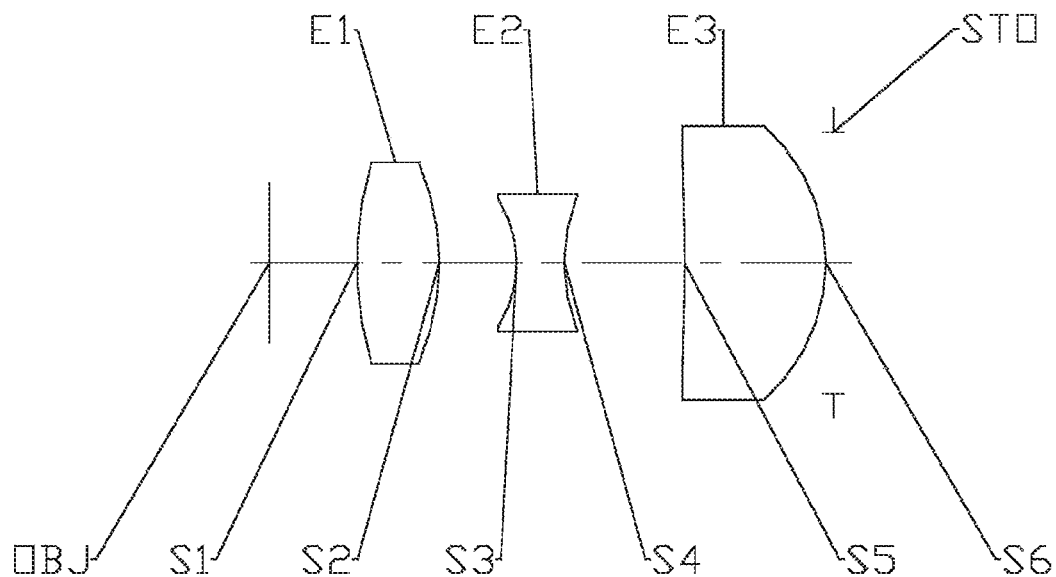
FIG. 11 is a schematic structural diagram illustrating a projection lens assembly according to Embodiment 6 of the present disclosure.

A projection lens assembly according to Embodiment 6 of the present disclosure is described below with reference to FIGS. 11-12. FIG. 11 is a schematic structural diagram illustrating the projection lens assembly according to Embodiment 6 of the present disclosure.

As shown in FIG. 11, the projection lens assembly according to the exemplary implementations of the present disclosure includes, sequentially along an optical axis from an image-source side to an image side, a first lens E1, a second lens E2, a third lens E3, and a diaphragm STO.

The first lens E1 has a positive refractive power, an image-source-side surface S1 of the first lens E1 is a convex surface, and an image-side surface S2 of the first lens E1 is a convex surface. The second lens E2 has a negative refractive power, an image-source-side surface S3 of the second lens E2 is a concave surface, and an image-side surface S4 of the second lens E2 is a concave surface. The third lens E3 has a positive refractive power, an image-source-side surface S5 of the third lens E3 is a convex surface, and an image-side surface S6 of the third lens E3 is a convex surface. A light transmittance of the projection lens assembly is greater than 85% within a light wavelength range from about 800 nm to about 1000 nm. Light from an image source sequentially passes through the surfaces S1-S6 and finally forms an image on, for example, the projection plane of a projection screen (not shown).

Table 16 shows the surface type, the radius of curvature, the thickness, the material and the conic coefficient of each lens of the projection lens assembly in Embodiment 6. The radius of curvature and the thickness are both shown in millimeters (mm).

TABLE 16

| surface number | surface type | radius of curvature | thickness | material refractive index | material abbe number | conic coefficient |
|---|---|---|---|---|---|---|
| OBJ | spherical | infinite | 0.5500 | | | |
| S1 | aspheric | 2.1112 | 0.5184 | 1.74 | 51.2 | −9.5345 |
| S2 | aspheric | −1.9871 | 0.4871 | | | −2.0031 |
| S3 | aspheric | −0.9304 | 0.3000 | 1.55 | 71.7 | 1.6115 |
| S4 | aspheric | 1.0504 | 0.7562 | | | −11.1385 |
| S5 | aspheric | 117.8825 | 0.8875 | 1.55 | 71.7 | −99.0000 |
| S6 | aspheric | −1.1177 | 0.0500 | | | −0.2983 |
| STO | spherical | infinite | 500.0000 | | | |
| IMA | spherical | infinite | | | | |

As may be obtained from Table 16, in Embodiment 6, the image-source-side surface and the image-side surface of any lens in the first to third lenses E1-E3 are both aspheric surfaces. Table 17 shows the high-order coefficients applicable to each aspheric surface in Embodiment 6. The surface type of each aspheric surface may be defined by the formula (1) given in Embodiment 1.

TABLE 17

| surface number | A4 | A6 | A8 | A10 | A12 |
|---|---|---|---|---|---|
| S1 | 1.1960E−03 | 2.4802E−01 | −2.2374E−01 | 5.6552E−01 | −9.9505E−01 |
| S2 | −3.4922E−01 | 6.0953E−01 | −8.8702E−01 | 1.3545E+00 | −1.2899E+00 |
| S3 | −1.6735E+00 | 9.3122E+00 | −2.0874E+01 | 2.5616E+01 | 1.0551E+01 |
| S4 | 3.5970E−03 | 4.0683E+00 | −1.3595E+01 | 3.0584E+01 | −3.4256E+01 |
| S5 | −8.7590E−02 | 4.4488E−02 | −1.5820E−02 | 1.6401E−02 | 5.9630E−03 |
| S6 | −1.4270E−02 | −1.0000E−02 | −3.2100E−03 | −4.9600E−03 | 2.1800E−04 |

Table 18 shows the total effective focal length f of the projection lens assembly in Embodiment 6, the effective focal lengths f1-f3 of the lenses, and the half of the maximal field-of-view HFOV of the prejection lens assembly.

TABLE 18

| | parameter | | | | |
|---|---|---|---|---|---|
| | f (mm) | f1 (mm) | f2 (mm) | f3 (mm) | HFOV (°) |
| numerical value | 3.61 | 1.46 | −0.86 | 2.03 | 7.9 |

Figure 12:
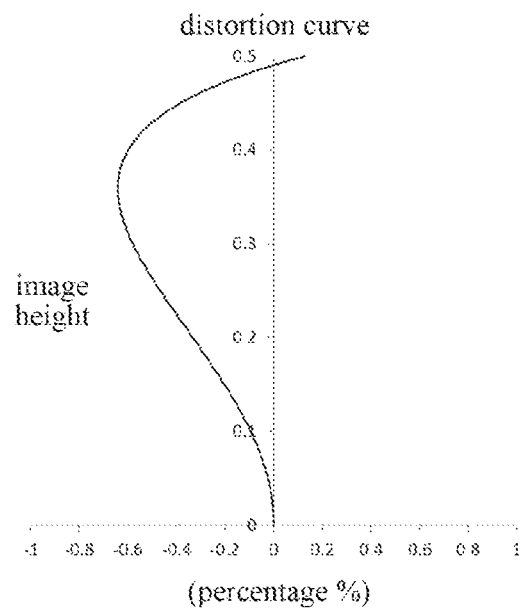
FIG. 12 illustrates a distortion curve of the projection lens assembly according to Embodiment 6.

FIG. 12 illustrates the distortion curve of the projection lens assembly according to Embodiment 6, representing amounts of distortion at different viewing angles. It can be seen from FIG. 12 that the projection lens assembly according to Embodiment 6 can achieve a good imaging quality.

Embodiment 7

Figure 13:
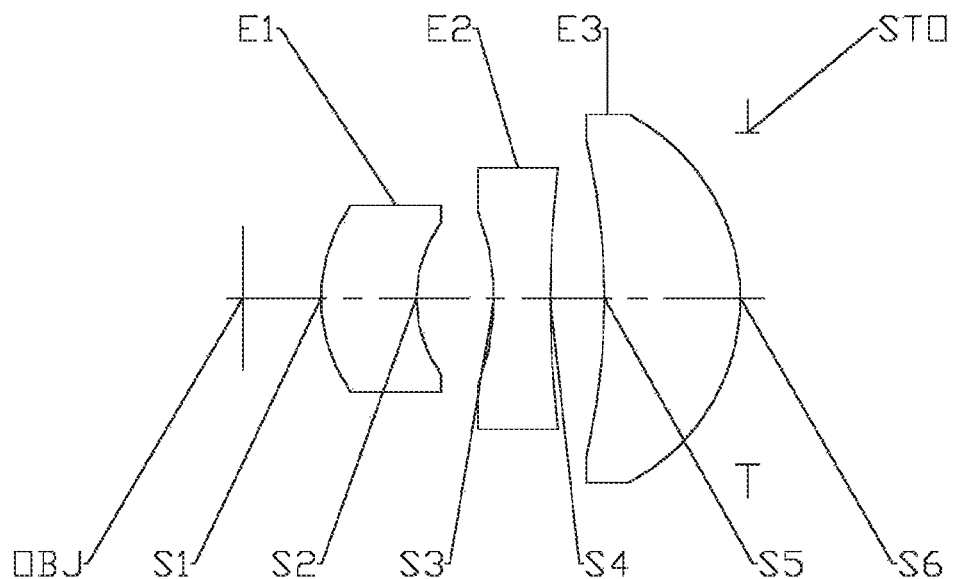
FIG. 13 is a schematic structural diagram illustrating a projection lens assembly according to Embodiment 7 of the present disclosure.

A projection lens assembly according to Embodiment 7 of the present disclosure is described below with reference to FIGS. 13-14. FIG. 13 is a schematic structural diagram illustrating the projection lens assembly according to Embodiment 7 of the present disclosure.

As shown in FIG. 13, the projection lens assembly according to the exemplary implementations of the present disclosure includes, sequentially along an optical axis from an image-source side to an image side, a first lens E1, a second lens E2, a third lens E3, and a diaphragm STO.

The first lens E1 has a negative refractive power, an image-source-side surface S1 of the first lens E1 is a convex surface, and an image-side surface S2 of the first lens E1 is a concave surface. The second lens E2 has a negative refractive power, an image-source-side surface S3 of the second lens E2 is a concave surface, and an image-side surface S4 of the second lens E2 is a concave surface. The third lens E3 has a positive refractive power, an image-source-side surface S5 of the third lens E3 is a concave surface, and an image-side surface S6 of the third lens E3 is a convex surface. A light transmittance of the projection lens assembly is greater than 85% within a light wavelength range from about 800 nm to about 1000 nm. Light from an image source sequentially passes through the surfaces S1-S6 and finally forms an image on, for example, the projection plane of a projection screen (not shown).

Table 19 shows the surface type, the radius of curvature, the thickness, the material and the conic coefficient of each lens of the projection lens assembly in Embodiment 7. The radius of curvature and the thickness are both shown in millimeters (mm).

TABLE 19

| surface number | surface type | radius of curvature | thickness | material refractive index | abbe number | conic coefficient |
|---|---|---|---|---|---|---|
| OBJ | spherical | infinite | 0.5500 | | | |
| S1 | aspheric | 1.8035 | 0.6699 | 1.53 | 55.8 | −13.9587 |
| S2 | aspheric | 1.5399 | 0.5479 | | | −6.4175 |
| S3 | aspheric | −2.6077 | 0.3937 | 1.53 | 55.8 | −47.0005 |
| S4 | aspheric | 70.0519 | 0.3828 | | | −99.0000 |
| S5 | aspheric | −2.9204 | 0.9558 | 1.81 | 37.3 | −24.4065 |
| S6 | aspheric | −1.3616 | 0.0500 | | | −0.0160 |
| STO | spherical | infinite | 500.0000 | | | |
| IMA | spherical | infinite | | | | |

As may be obtained from Table 19, in Embodiment 7, the image-source-side surface and the image-side surface of any lens in the first to third lenses E1-E3 are both aspheric surfaces. Table 20 shows the high-order coefficients applicable to each aspheric surface in Embodiment 7. The surface type of each aspheric surface may be defined by the formula (1) given in Embodiment 1.

TABLE 17

| surface number | A4 | A6 | A8 | A10 | A12 | A14 | A16 |
|---|---|---|---|---|---|---|---|
| S1 | 8.0618E−01 | −7.5892E−01 | 1.9544E+00 | −2.8636E+00 | 3.1036E+00 | −1.7204E+01 | 2.7633E+01 |
| S2 | 8.9737E−01 | −2.0510E−02 | 6.1155E+00 | −4.1610E+01 | 3.0605E+02 | −1.0950E+03 | 1.3164E+03 |
| S3 | −1.7417E−01 | −1.4934E−01 | −5.2188E+00 | 4.2122E+01 | −1.9097E+02 | 4.6483E+02 | −4.9756E+02 |
| S4 | 4.6213E−01 | −1.3016E+00 | 2.4156E+00 | −2.5912E+00 | 7.9924E−01 | 6.0891E−01 | −3.4623E−01 |
| S5 | −8.9400E−03 | −1.7000E−04 | 4.5942E−02 | −1.9390E−02 | −1.8840E−02 | 1.0944E−02 | −1.7800E−03 |
| S6 | 1.4138E−02 | 3.5000E−04 | 3.4980E−03 | 2.8280E−03 | −1.3800E−03 | 8.0300E+04 | 4.9700E−04 |

Table 21 shows the total effective focal length f of the projection lens assembly in Embodiment 7, the effective focal lengths f1-f3 of the lenses, and the half of the maximal field-of-view HFOV of the prejection lens assembly.

TABLE 21

| | parameter | | | | |
|---|---|---|---|---|---|
| | f (mm) | f1 (mm) | f2 (mm) | f3 (mm) | HFOV (°) |
| numerical value | 3.64 | −161.54 | −4.77 | 2.46 | 7.9 |

Figure 14:
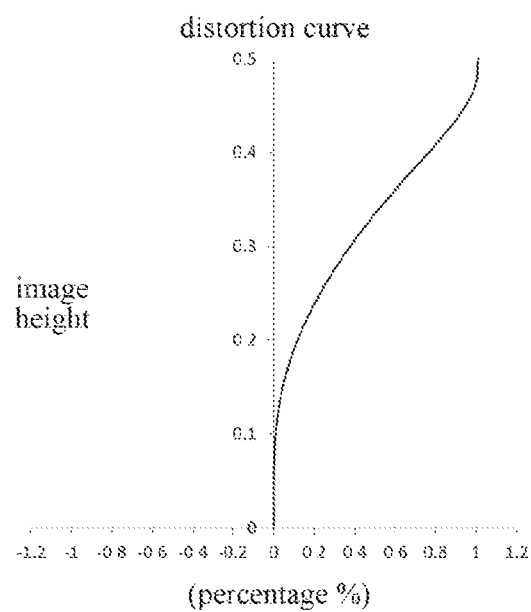
FIG. 14 illustrates a distortion curve of the projection lens assembly according to Embodiment 7.

FIG. 14 illustrates the distortion curve of the projection lens assembly according to Embodiment 7, representing amounts of distortion at different viewing angles. It can be seen from FIG. 14 that the projection lens assembly according to Embodiment 7 can achieve a good imaging quality.

Embodiment 8

Figure 15:
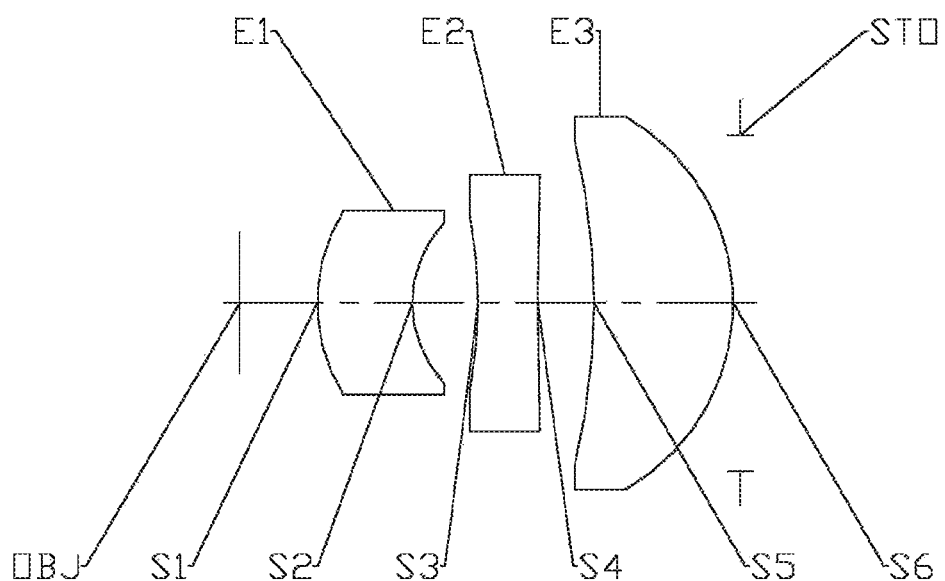
FIG. 15 is a schematic structural diagram illustrating a projection lens assembly according to Embodiment 8 of the present disclosure.

A projection lens assembly according to Embodiment 8 of the present disclosure is described below with reference to FIGS. 15-16. FIG. 15 is a schematic structural diagram illustrating the projection lens assembly according to Embodiment 8 of the present disclosure.

As shown in FIG. 15, the projection lens assembly according to the exemplary implementations of the present disclosure includes, sequentially along an optical axis from an image-source side to an image side, a first lens E1, a second lens E2, a third lens E3, and a diaphragm STO.

The first lens E1 has a negative refractive power, an image-source-side surface S1 of the first lens E1 is a convex surface, and an image-side surface S2 of the first lens E1 is a concave surface. The second lens E2 has a positive refractive power, an image-source-side surface S3 of the second lens E2 is a convex surface, and an image-side surface S4 of the second lens E2 is a convex surface. The third lens E3 has a positive refractive power, an image-source-side surface S5 of the third lens E3 is a concave surface, and an image-side surface S6 of the third lens E3 is a convex surface. A light transmittance of the projection lens assembly is greater than 85% within a light wavelength range from about 800 nm to about 1000 nm. Light from an image source sequentially passes through the surfaces S1-S6 and finally forms an image on, for example, the projection plane of a projection screen (not shown).

Table 22 shows the surface type, the radius of curvature, the thickness, the material and the conic coefficient of each lens of the projection lens assembly in Embodiment 8. The radius of curvature and the thickness are both shown in millimeters (mm).

TABLE 22

| surface number | surface type | radius of curvature | thickness | material refractive index | abbe number | conic coefficient |
|---|---|---|---|---|---|---|
| OBJ | spherical | infinite | 0.5500 | | | |
| S1 | aspheric | 1.4043 | 0.6748 | 1.53 | 55.8 | −20.8263 |
| S2 | aspheric | 0.8395 | 0.4667 | | | −6.6628 |
| S3 | aspheric | 134.3729 | 0.4221 | 1.53 | 55.8 | −99.0000 |
| S4 | aspheric | −18.3366 | 0.3987 | | | 50.0000 |
| S5 | aspheric | −2.4465 | 0.9877 | 1.81 | 37.3 | −20.3684 |
| S6 | aspheric | −1.3813 | 0.0500 | | | −0.0456 |
| STO | spherical | infinite | 500.0000 | | | |
| IMA | spherical | infinite | | | | |

As may be obtained from Table 22, in Embodiment 8, the image-source-side surface and the image-side surface of any lens in the first to third lenses E1-E3 are both aspheric surfaces. Table 23 shows the high-order coefficients applicable to each aspheric surface in Embodiment 8. The surface type of each aspheric surface may be defined by the formula (1) given in Embodiment 1.

TABLE 23

| surface number | A4 | A6 | A8 | A10 | A12 | A14 | A16 |
|---|---|---|---|---|---|---|---|
| S1 | 7.8499E−01 | −1.0106E+00 | 2.7814E+00 | −5.0633E+00 | 7.5914E+00 | −4.1043E+01 | 6.5116E+01 |
| S2 | 9.7041E−01 | −4.7130E−02 | 5.4882E+00 | −4.6017E+01 | 2.9310E+02 | −1.1282E+03 | 1.4964E+03 |
| S3 | −1.4075E−01 | −5.7600E−02 | −5.0503E+00 | 4.1943E+01 | −1.9223E+02 | 4.6447E+02 | −4.8365E+02 |
| S4 | 4.4525E−01 | −1.3057E+00 | 2.4192E+00 | −2.5876E+00 | 7.9885E−01 | 6.0701E−01 | −3.3933E−01 |
| S5 | −7.4900E−03 | 1.0790E−03 | 4.6866E−02 | −1.8170E−02 | −1.7640E−02 | 1.1582E−02 | −2.0100E−03 |
| S6 | 1.8257E−02 | −5.5000E−04 | 3.5640E−03 | 3.0350E−03 | −1.3500E−03 | 7.2700E−04 | 4.0300E−04 |

Table 24 shows the total effective focal length f of the projection lens assembly in Embodiment 8, the effective focal lengths f1-f3 of the lenses, and the half of the maximal field-of-view HFOV of the projection lens assembly.

TABLE 24

| | parameter | | | | |
|---|---|---|---|---|---|
| | f (mm) | f1 (mm) | f2 (mm) | f3 (mm) | HFOV (°) |
| numerical value | 3.57 | −6.74 | 30.68 | 2.75 | 8.0 |

Figure 16:
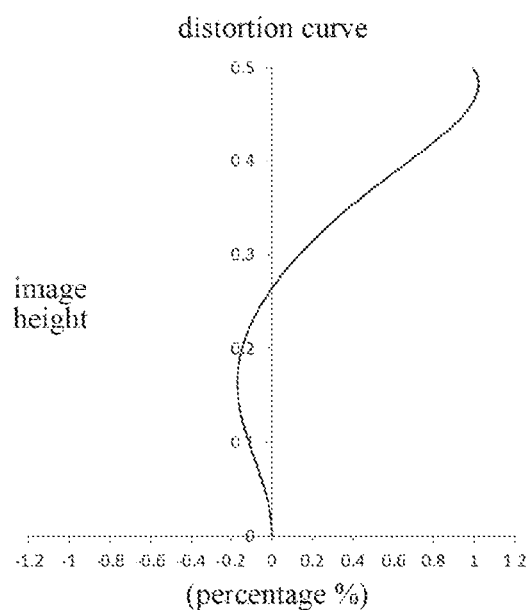
FIG. 16 illustrates a distortion curve of the projection lens assembly according to Embodiment 8.

FIG. 16 illustrates the distortion curve of the projection lens assembly according to Embodiment 8, representing amounts of distortion at different viewing angles. It can be seen from FIG. 16 that the projection lens assembly according to Embodiment 8 can achieve a good imaging quality.

To sum up, Embodiments 1-8 respectively satisfy the relationships shown in Table 25 below.

TABLE 25

| Conditional Expression | Embodiment | | | | | | | |
|---|---|---|---|---|---|---|---|---|
| | 1 | 2 | 3 | 4 | 5 | 6 | 7 | 8 |
| HFOV (°) | 8.4 | 8.0 | 8.1 | 8.3 | 8.1 | 7.9 | 7.9 | 8.0 |
| f3/f | 1.58 | 0.67 | 0.68 | 0.73 | 0.57 | 0.56 | 0.68 | 0.77 |
| R6/f | −0.30 | −0.39 | −0.39 | −0.36 | −0.28 | −0.31 | −0.37 | −0.39 |
| CT1/CT2 | 1.57 | 1.39 | 1.59 | 1.58 | 1.78 | 1.73 | 1.70 | 1.60 |
| T12/CT3 | 0.70 | 0.78 | 0.62 | 0.15 | 0.73 | 0.55 | 0.57 | 0.47 |
| DT22/DT21 | 1.16 | 1.33 | 1.37 | 1.05 | 1.01 | 1.06 | 1.49 | 1.45 |
| DT32/DT31 | 1.21 | 1.07 | 1.08 | 1.12 | 1.18 | 1.22 | 1.16 | 1.15 |
| f3/f1 | 0.85 | 0.60 | 0.58 | 1.41 | 1.44 | 1.39 | −0.02 | −0.41 |
| TTL/f | 1.04 | 0.97 | 0.98 | 1.01 | 0.95 | 0.97 | 0.96 | 0.98 |
| BF/TTL | 0.16 | 0.16 | 0.16 | 0.16 | 0.17 | 0.16 | 0.16 | 0.16 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A projection lens assembly comprising, sequentially along an optical axis from an image-source side to an image side,
a first lens having a positive refractive power or a negative refractive power;
a second lens having a positive refractive power or a negative refractive power; and
a third lens having a positive refractive power, wherein an image-side surface of the third lens is a convex surface;
wherein a distance TTL on the optical axis from an image-source plane of the projection lens assembly to the image-side surface of the third lens and a total effective focal length f of the projection lens assembly satisfy: TTL/f<1.4, and
an effective focal length f3 of the third lens and the total effective focal length f of the projection lens assembly satisfy: 0<f3/f<18.0,
wherein the projection lens assembly has and only has three lenses having refractive power,
wherein half of a maximal field-of-view HFOV of the projection lens assembly satisfies: HFOV≤8.4°, and
wherein a distance BF on the optical axis from the image-source plane of the projection lens assembly to an image-source-side surface of the first lens and the distance TTL on the optical axis from the image-source plane of the projection lens assembly to the image-side surface of the third lens satisfy: 0.16≤BF/TTL<0.5.

2. The projection lens assembly according to claim 1, wherein a center thickness CT1 of the first lens on the optical axis and a center thickness CT2 of the second lens on the optical axis satisfy: 1.3<CT1/CT2<1.8.

3. The projection lens assembly according to claim 1, wherein a radius of curvature R6 of the image-side surface of the third lens and the total effective focal length f of the projection lens assembly satisfy: −0.5<R6/f<0.

4. The projection lens assembly according to claim 1, wherein a spacing distance T12 on the optical axis between the first lens and the second lens and a center thickness CT3 of the third lens on the optical axis satisfy: 0.1<T12/CT3<0.8.

5. The projection lens assembly according to claim 1, wherein an effective semi-diameter DT22 of an image-side surface of the second lens and an effective semi-diameter DT21 of an image-source-side surface of the second lens satisfy: 1.0<DT22/DT21<1.5.

6. The projection lens assembly according to claim 1, wherein an effective semi-diameter DT32 of the image-side surface of the third lens and an effective semi-diameter DT31 of an image-source-side surface of the third lens satisfy: 1.0<DT32/DT31<1.3.

7. The projection lens assembly according to claim 1, wherein a light transmittance of the projection lens assembly is greater than 85% within a light wavelength range from 800 nm to 1000 nm.

8. A projection lens assembly comprising, sequentially along an optical axis from an image-source side to an image side,
a first lens having a positive refractive power or a negative refractive power;

a second lens having a positive refractive power or a negative refractive power; and a third lens having a positive refractive power, wherein an image-side surface of the third lens is a convex surface;

wherein a distance TTL on the optical axis from an image-source plane of the projection lens assembly to the image-side surface of the third lens and a total effective focal length f of the projection lens assembly satisfy: TTL/f<1.4, and an effective focal length f3 of the third lens and an effective focal length f1 of the first lens satisfy: −1.0<f3/f1<30.0, wherein the projection lens assembly has and only has three lenses having refractive power, wherein a distance BF on the optical axis from the image-source plane of the projection lens assembly to an image-source-side surface of the first lens and the distance TTL on the optical axis from the image-source plane of the projection lens assembly to the image-side surface of the third lens satisfy: 0.16<BF/TTL<0.5, and wherein a center thickness CT1 of the first lens on the optical axis and a center thickness CT2 of the second lens on the optical axis satisfy: 1.3<CT1/CT2<1.8.

9. The projection lens assembly according to claim 8, wherein an effective semi-diameter DT22 of an image-side surface of the second lens and an effective semi-diameter DT21 of an image-source-side surface of the second lens satisfy: 1.0<DT22/DT21<1.5.

10. The projection lens assembly according to claim 8, wherein an effective semi-diameter DT32 of the image-side surface of the third lens and an effective semi-diameter DT31 of an image-source-side surface of the third lens satisfy: 1.0<DT32/DT31<1.3.

11. The projection lens assembly according to claim 8, wherein the effective focal length f3 of the third lens and the total effective focal length f of the projection lens assembly satisfy: 0.5<f3/f<1.6.

12. The projection lens assembly according to claim 11, wherein a radius of curvature R6 of the image-side surface of the third lens and the total effective focal length f of the projection lens assembly satisfy: −0.5<R6/f<0.

13. The projection lens assembly according to claim 8, wherein a spacing distance T12 on the optical axis between the first lens and the second lens and a center thickness CT3 of the third lens on the optical axis satisfy: 0.1<T12/CT3<0.8.

14. The projection lens assembly according to claim 8, wherein half of a maximal field-of-view HFOV of the projection lens assembly satisfies: HFOV<10°.

15. The projection lens assembly according to claim 8, wherein a light transmittance of the projection lens assembly is greater than 85% within a light wavelength range from 800 nm to 1000 nm.

* * * * *